(12) United States Patent
Barr (10) Patent No.: US 9,143,898 B1
(45) Date of Patent: Sep. 22, 2015

(54) AUTOMATICALLY SELECTING ALERT MODES BASED ON LOCATION

(71) Applicant: Amazon Technologies, Inc., Reno, NV (US)

(72) Inventor: Jeffrey Scott Barr, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 10 days.

(21) Appl. No.: 13/867,462

(22) Filed: Apr. 22, 2013

(51) Int. Cl.
- *H04W 24/00* (2009.01)
- *H04W 4/02* (2009.01)
- *H04W 4/04* (2009.01)

(52) U.S. Cl.
CPC ............. *H04W 4/025* (2013.01); *H04W 4/027* (2013.01); *H04W 4/04* (2013.01)

(58) Field of Classification Search
CPC ........ H04W 4/025; H04W 4/027; H04W 4/04
USPC .......... 455/412.2, 414.2, 456.1, 456.3, 456.4, 455/456.6
See application file for complete search history.

(56) References Cited

U.S. PATENT DOCUMENTS

| | | | |
|---|---|---|---|
| 6,271,764 B1 | 8/2001 | Okamura | |
| 6,408,187 B1 | 6/2002 | Merriam | |
| 7,469,155 B2 | 12/2008 | Chu | |
| 8,774,825 B2 | 7/2014 | Forstall et al. | |
| 8,781,500 B1 * | 7/2014 | Dekel | 455/456.3 |
| 2003/0054866 A1 | 3/2003 | Byers et al. | |
| 2004/0203673 A1 | 10/2004 | Seligmann | |
| 2005/0054290 A1 | 3/2005 | Logan et al. | |
| 2005/0136903 A1 | 6/2005 | Kashima et al. | |
| 2006/0003752 A1 | 1/2006 | Rivera-Cintron et al. | |
| 2006/0019638 A1 | 1/2006 | Chiu et al. | |
| 2006/0025159 A1 | 2/2006 | Estevez et al. | |
| 2006/0116142 A1 | 6/2006 | Cofta | |
| 2006/0135139 A1 | 6/2006 | Cheng et al. | |
| 2006/0153358 A1 | 7/2006 | Zernovizky et al. | |
| 2007/0032225 A1 | 2/2007 | Konicek et al. | |
| 2007/0037605 A1 | 2/2007 | Logan | |
| 2007/0037610 A1 | 2/2007 | Logan | |
| 2007/0264974 A1 | 11/2007 | Frank et al. | |
| 2008/0032666 A1 | 2/2008 | Hughes et al. | |
| 2008/0170683 A1 | 7/2008 | Zernovizky et al. | |
| 2009/0298511 A1 | 12/2009 | Paulson | |
| 2010/0004000 A1 | 1/2010 | Chen | |
| 2012/0077518 A1 | 3/2012 | Logan | |
| 2012/0276878 A1 | 11/2012 | Othmer et al. | |
| 2013/0178233 A1 * | 7/2013 | McCoy et al. | 455/456.3 |
| 2013/0331067 A1 | 12/2013 | Coussemaeker et al. | |
| 2014/0004886 A1 * | 1/2014 | Gillett et al. | 455/456.6 |

OTHER PUBLICATIONS

U.S. Appl. No. 13/474,047, filed May 17, 2012 and entitled "Discovery of Public Points of Interest".

(Continued)

*Primary Examiner* — Khalid Shaheed
(74) *Attorney, Agent, or Firm* — Thomas | Horstemeyer, LLP (57) ABSTRACT

Disclosed are various embodiments for automatically selecting alert modes for a mobile device based at least in part on the mobile device location. A location of the mobile device is determined. A map feature classification of the location is obtained from a server. One or more notifications of the mobile device are automatically to use a particular alert mode that is selected based at least in part on the map feature classification of the location.

26 Claims, 5 Drawing Sheets

(56) References Cited

OTHER PUBLICATIONS

U.S. Appl. No. 13/596,119, filed Aug. 28, 2012 and entitled "Mobile Notifications Based Upon Location".

"Locale—Android Apps on Google Play," retrieved on Apr. 19, 2013, https://play.google.com/store/apps/details?id=com.twofortyfouram.locale&hl=en.

"Locale—Location Based Actions—Mobile Apps 4 Biz," retrieved on Apr. 19, 2013, http://mobileapps4biz.net/2012/06/11/locale-location-based-actions/.

"Set Phone Profiles Based on Location & Automate Tasks & Settings on an . . . ," retrieved on Apr. 19, 2013, http://androidadvices.com/set-phone-profiles-based-location-automate-tasks-settings-android/.

* cited by examiner

100a

103a

Current Location:
3101 Cobb Pkwy
201

Type of Location:
Movie Theater

Device Alert Mode:
SILENT

100b

103b

Current Location:
Tractor Pull at
423 Fairgrounds Way

Type of Location:
Outdoor Event

Device Alert Mode:
OUTDOOR

AUTOMATICALLY SELECTING ALERT MODES BASED ON LOCATION

BACKGROUND

Mobile telephones may have a variety of alert modes. For example, a phone may be put into a silent mode where the ringer is off, a vibration mode where the ringer is off and a vibration device is on, an indoor mode where the ringer is on at a low or medium setting, an outdoor mode where the ringer is on at a high setting, and/or other modes. Users sometimes forget to change the alert mode on their phones, leading to distraction and embarrassment, for example, when a loud phone ringtone inappropriately goes off in a quiet setting.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to selection of alert modes for mobile devices. Users sometimes forget to change the alert mode for their mobile phones. For example, sometimes a loud ring tone may go off while a user is watching a movie in a movie theater. Alternatively, users may put their phones in a silent mode for an occasion and then forget to change to a non-silent mode. Consequently, a user may miss an important call afterward because the phone was left in silent mode. Moreover, a user may attend a loud outdoor event without changing the ringer volume from low to high, possibly resulting in missed calls because the ringer is inaudible in the outdoor environment.

Various embodiments of the present disclosure facilitate automatic selection of an alert mode based at least in part on the current location of the mobile device. The current location of the mobile device is determined by a global satellite navigation system in the mobile device 103 (e.g., global positioning system (GPS), global navigation satellite system (GLONASS), etc.), terrestrial-based triangulation service, and so on. A map feature is then ascertained using mapping data that associates geographical areas with businesses, establishments, offices, events, human-made features, natural features, and so on. A classification of the map feature is then determined. An appropriate alert mode is selected based upon the map feature classification and one or more rules.

Figure 1:
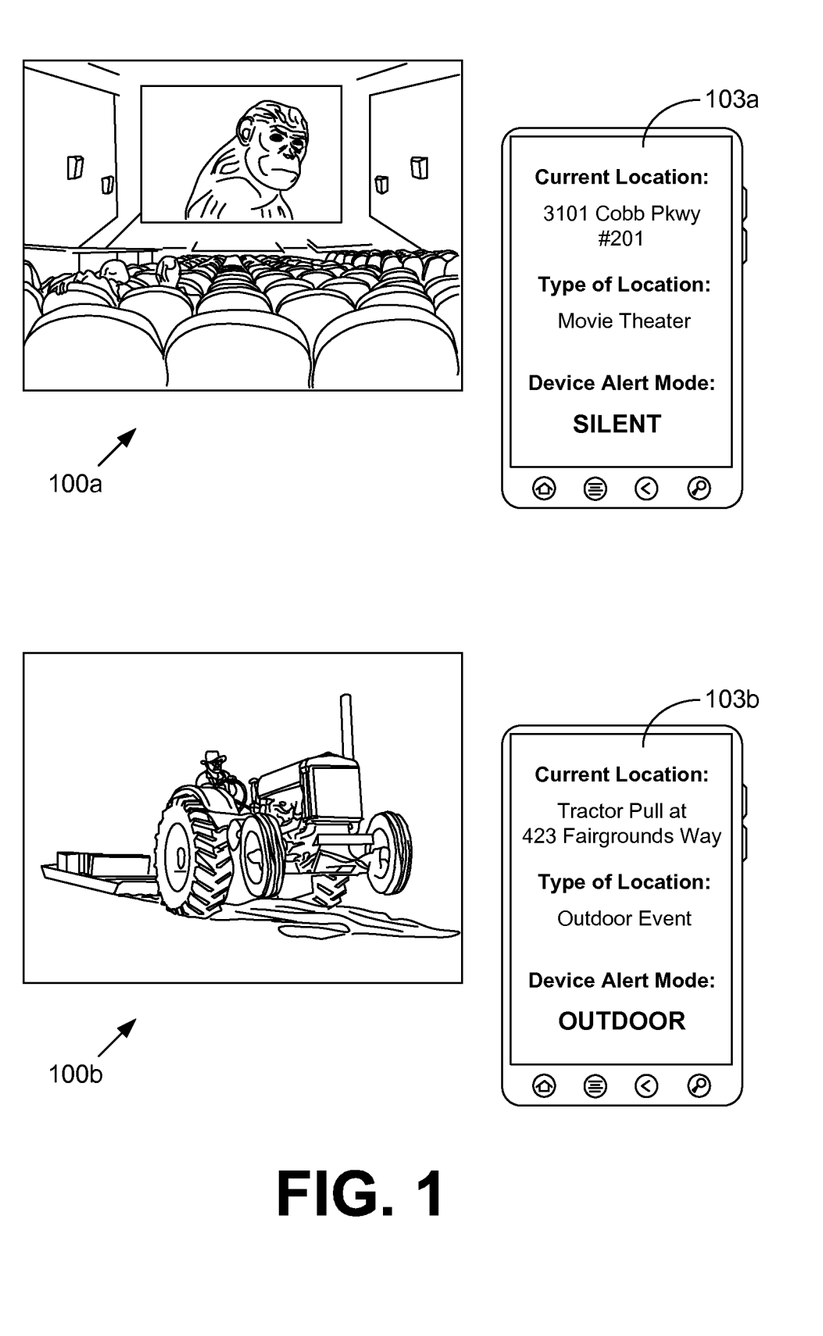
FIG. 1 is a drawing of example scenarios of alert mode selection according to various embodiments of the present disclosure.

Referring now to FIG. 1, shown are example scenarios 100a and 100b of alert mode selection according to various embodiments. In scenario 100a, a user of a mobile device 103a is watching a movie in a movie theater. The location of the device is determined to be "3101 Cobb Pkwy #201." In one embodiment, such a location may be determined based at least in part on criteria such as latitude, longitude, altitude, and/or time. The location may be associated with a map feature such as "Hollywood Cinemas," which may be associated with a classification of "movie theater." A rule may be configured for the mobile device 103a so as to put the mobile device 103a in a silent mode when the mobile device 103a is in a movie theater. The mobile device 103a thus may be automatically configured in silent mode in response to determining the current location.

In scenario 100b, a user of a mobile device 103b is watching a tractor pull. The location of the device is determined to be "423 Fairgrounds Way." The location may be associated with a map feature such as a fairground, or more specifically a "tractor pull," given the current time and a scheduled time period for the tractor pull. The tractor pull may be associated with a classification of "outdoor event." A rule may be configured for the mobile device 103b so as to put the mobile device 103b in an outdoor mode with a high volume when the mobile device 103b is in an area where an outdoor event is occurring. The mobile device 103b thus may be automatically configured in outdoor mode in response to determining the current location. It is noted that the same location, the fairground, may host events other than tractor pulls at other times. Such events may be of a more formal or quiet character, which may result in a selection of silent mode or another alert mode as desired. In the following discussion, a general description of the system and its components is provided, followed by a discussion of the operation of the same.

Figure 2:
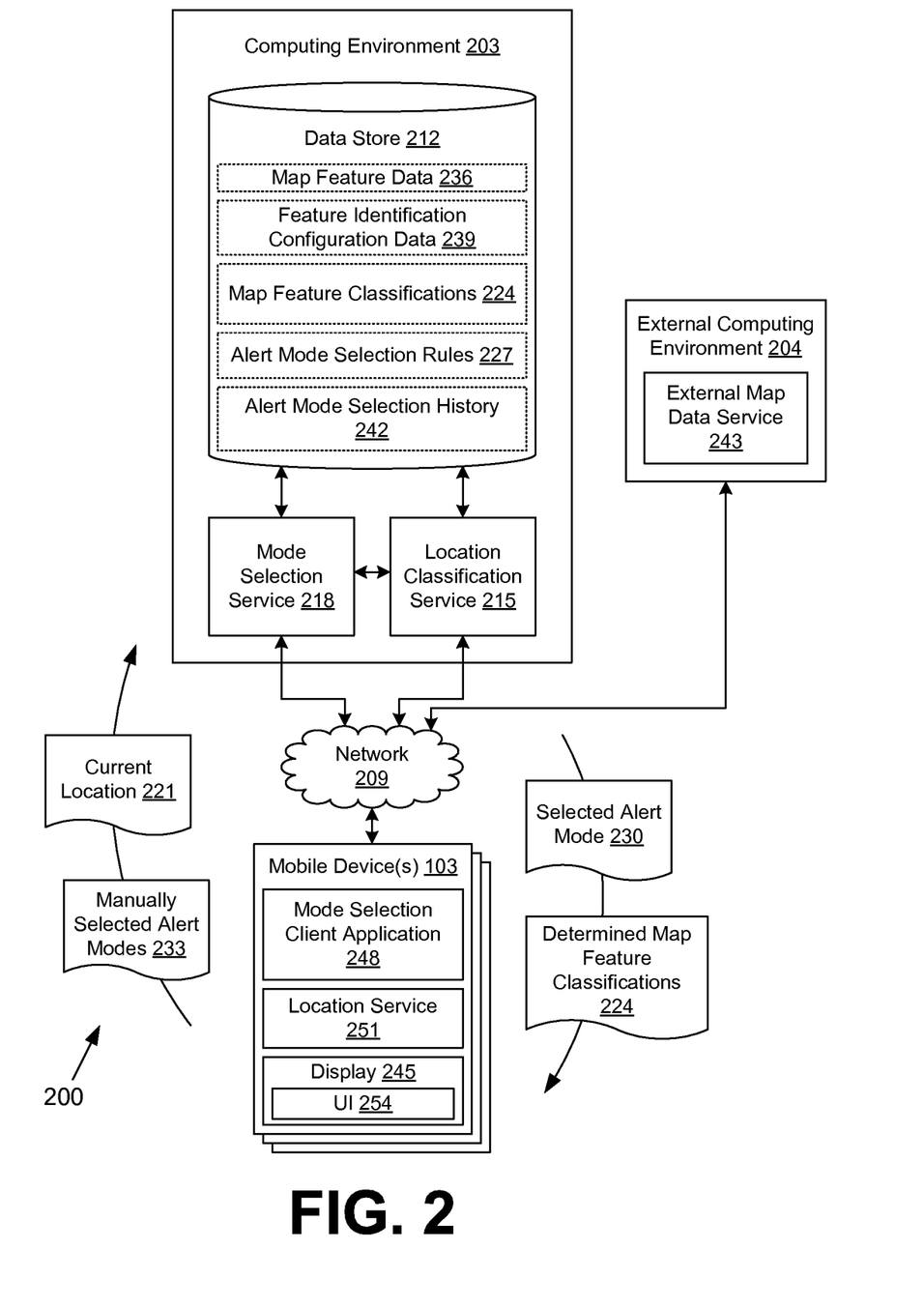
FIG. 2 is a drawing of a networked environment according to various embodiments of the present disclosure.

With reference to FIG. 2, shown is a networked environment 200 according to various embodiments. The networked environment 200 may include a computing environment 203, an external computing environment 204, and one or more mobile devices 103 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that are arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a location classification service 215, a mode selection service 218, and other applications, services, processes, systems, engines, or functionality not discussed in detail herein. The location classification service 215 is executed to receive current locations 221 from mobile device 103 and determine map feature classifications 224 corresponding to the current locations 221. Such determined map feature classifications 224 may be returned to the mobile devices 103 via the network 209 or may be returned to a mode selection service 218.

The mode selection service 218 is configured to select alert modes for one or more notifications of the mobile device 103 based at least in part on determined map feature classifications 224 and one or more alert mode selection rules 227. The mode selection service 218 may automatically initiate configuration of the mobile device 103 in response to selecting an alert mode. To this end, a selected alert mode 230 may be returned to the mobile device 103 via the network 209. In one embodiment, the mode selection service 218 may receive manually selected alert modes 233 from mobile devices 103. The manually selected alert modes 233 may be employed to crowd source selection of alert modes for a given map feature or map feature classification 224.

The data stored in the data store 212 includes, for example, map feature data 236, feature identification configuration data 239, map feature classifications 224, alert mode selection rules 227, alert mode selection history 242, and potentially other data. The map feature data 236 identifies various map features for a geography. Such features may include features such as, for example, retailers, restaurants, event venues, offices, cemeteries, places of worship, movie theaters, libraries, beaches, rivers, parks, golf courses, amusement parks, fairgrounds, meeting rooms, and/or other map features. In some embodiments, such map feature data 236 may be obtained from an external data provider. Various techniques for discovering map features are described in U.S. patent application Ser. No. 13/474,047 filed on May 17, 2012 and entitled "DISCOVERY OF PUBLIC POINTS OF INTEREST," which is incorporated herein by reference in its entirety. Some of the map features may be permanent while others may be ephemeral. Ephemeral map features may be, for example, events, businesses, etc. which are scheduled to exist for a predefined time period or duration. Thus, the map feature data 236 may include a time range or duration for a given map feature.

Each of the map features may be associated with a respective geographic area, and a given location 221 may be evaluated as being within or outside of the geographic area. In one embodiment, a geographic area is defined as a distance from reference coordinates for the map feature. In another embodiment, a geographic area is defined using a boundary. In some cases, a geographic area for a map feature may be defined also in terms of altitude. As a non-limiting example, a multi-story office building may have one map feature located at the 15th floor and another map feature located at the 2nd floor.

The feature identification configuration data 239 may include various configuration parameters employed to configure how map features are identified for a given location 221. For example, the feature identification configuration data 239 may indicate that a mobile device 103 within 10 feet outside of the boundary of a map feature geographic area will be considered to be within or at the particular map feature. Alternatively, or additionally, the feature identification configuration data 239 may indicate that a mobile device 103 within 5 feet inside of the boundary of a map feature geographic area will be considered to be within or at the particular map feature.

The map feature classifications 224 correspond to various generic classifications that may be applied to specific map features. As an example, a map feature identified as "Hollywood Cinemas 18" in the map feature data 236 may be classified as a "movie theater" under the map feature classifications 224. As another example, a map feature identified as "Washington Public Library" in the map feature data 236 may be classified as a "library" under the map feature classifications 224. As still another example, a map feature identified as "23rd Annual State Tractor Pull" may be classified as a "tractor pull" under the map feature classifications 224. It is noted that the map feature classifications 224 may include one or more hierarchies of such classifications. For example, a "tractor pull" classification may be further classified as an "outdoor event," a "library" may be further classified as a "government building," a "park" may be further classified as an "outdoor space," and so on.

The alert mode selection rules 227 may specify which alert modes are selected in response to the current location 221 being identified as corresponding to a particular map feature classification 224. For example, an alert mode selection rule 227 may specify that the mobile device 103 is to be placed in a silent mode upon entering a library. The alert mode selection rules 227 may be predefined or user specified. As will be discussed, in one embodiment, the alert mode selection rules 227 may be crowd sourced.

Additionally, different alert mode selection rules 227 may exist for different types of notifications (e.g., text messages, phone calls, emails, social networking notifications, application notifications, etc.) and/or for different sources (e.g., work, spouse, friends, uncategorized sources, etc.). As an example, a particular alert mode selection rule 227 may cause email notifications to be silenced for a particular map feature classification 224, while another alert mode selection rule 227 may allow for a low volume ringtone for phone calls received while the mobile device 103 is at the map feature associated with the same map feature classification 224. As another example, an alert mode selection rule 227 may indicate that a notification from a spouse is never silenced no matter the current location 221.

The alert mode selection rules 227 may have a hierarchical organization in keeping with hierarchical map feature classifications 224. For example, an alert mode selection rule 227 may specify that the mobile device 103 is to be placed in an outdoor mode in an outdoor event. More specific alert mode selection rules 227 may override more generic alert mode selection rules 227 when available. For example, an outdoor concert may be a type of outdoor event, but a specific alert mode selection rule 227 may specify that the mobile device 103 is to be placed in a vibration mode rather than the outdoor mode while at the outdoor concert.

In the vibration mode, a vibration device of the mobile device 103 may be activated rather than a sound device. Alternatively, or additionally, the mobile device 103 may be configured to modify a visual notification in particular alert modes. For example, the mobile device 103 may illuminate or not illuminate a light emitting diode (LED), display a more prominent or less prominent notification upon a display, and/or modify other types of visual notifications.

The alert mode selection rules 227 may be associated with parameters controlling activation. For example, if a user is detected to be at a location 221 but having a certain velocity meeting a minimum threshold (e.g., the user is merely driving by a map feature than staying there), the alert mode selection rule 227 may not activate an alert mode. Also, in some cases, an alert mode selection rule 227 may configure a reversion back to a previously selected alert mode in the mobile device 103 when the mobile device 103 is no longer detected as being at the particular map feature. In other cases, the alert mode selection rule 227 may permit the alert mode to persist when the mobile device 103 is no longer detected as being at the particular map feature.

The alert mode selection history 242 stores a history of manually selected alert modes 233 generated by users manually placing their mobile devices 103 in alert modes at particular locations. In one embodiment, the alert mode selection history 242 may be analyzed to automatically generate alert mode selection rules 227 based upon what other users have done manually in the past. For example, if users typically place their mobile devices 103 in a silent alert mode when at cemeteries, as recorded in the alert mode selection history 242, an alert mode selection rule 227 may be generated to place mobile devices 103 in such a silent alert mode when at map features classified as cemeteries.

The external computing environment 204 may comprise, for example, a server computer or any other system providing computing capability. Alternatively, the external computing environment 204 may employ a plurality of computing devices that are arranged, for example, in one or more server banks or computer banks or other arrangements. Such computing devices may be located in a single installation or may be distributed among many different geographical locations. For example, the external computing environment 204 may include a plurality of computing devices that together may comprise a cloud computing resource, a grid computing resource, and/or any other distributed computing arrangement. In some cases, the external computing environment 204 may correspond to an elastic computing resource where the allotted capacity of processing, network, storage, or other computing-related resources may vary over time. The external computing environment 204 may be operated by an entity that is different from the entity that operates the computing environment 203.

Various applications and/or other functionality may be executed in the external computing environment 204 according to various embodiments. The components executed on the external computing environment 204, for example, include an external map data service 243 and other applications, services, processes, systems, engines, or functionality not discussed in detail herein. The external map data service 243 may be executed to serve up map feature data 236, map feature classifications 224, and/or other information from external providers, where the information is relevant to mapping.

In one embodiment, the external map data service 243 is configured to identify a map feature based at least in part on a current location 221 provided by the computing environment 203 and/or the mobile device 103. Accordingly, the external map data service 243 is configured to return the map feature to the requestor via the network 209. In another embodiment, the external map data service 243 is configured to identify a map feature classification 224 based at least in part on a current location 221 provided by the computing environment 203 and/or the mobile device 103. Accordingly, the external map data service 243 is configured to return the map feature classification 224 to the requestor via the network 209. In yet another embodiment, the external map data service 243 serves up bulk map feature data 236 to the computing environment 203 via the network 209.

The mobile device 103 is representative of a plurality of mobile devices 103 that may be coupled to the network 209. The mobile device 103 may comprise, for example, a processor-based system such as a computer system. Such a computer system may be embodied in the form of a laptop computer, personal digital assistants, cellular telephones, smartphones, music players, tablet computer systems, game consoles, electronic book readers, or other devices with like capability. The mobile device 103 may include a display 245. The display 245 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. The mobile device 103 may also include a sound device, a vibration device, an LED device, and/or other output devices.

The mobile device 103 may be configured to execute various applications such as a mode selection client application 248, a location service 251, and/or other applications. The mode selection client application 248 may be executed to effect changes to the selected alert modes 230 of the mobile device 103 based at least in part on the current location 221 of the mobile device. The mode selection client application 248 may render a user interface 254 on the display 245 to indicate the status of alert mode changes as well as to facilitate configuration of alert mode selection rules 227 and various other configuration parameters. The location service 251 is employed to determine a current location 221 of the mobile device 103 from a GPS device, altimeter device, triangulation service, radio-frequency identifier (RFID) sensor device, and/or other location-finding sources. The mobile device 103 may be configured to execute applications beyond the mode selection client application 248 and the location service 251 such as, for example, browsers, mobile applications, email applications, social networking applications, and/or other applications.

Next, a general description of the operation of the various components of the networked environment 200 is provided. To begin, various alert mode selection rules 227 are configured in the data store 212. Such alert mode selection rules 227 may be manually preconfigured or automatically configured by the mode selection service 218 as a result of processing manually selected alert modes 233. The alert mode selection rules 227 may be entered by a particular user or crowd sourced as a result of other users entering alert mode selection rules 227.

A user of a mobile device 103 may carry the mobile device 103 to a new location. The mode selection client application 248 receives the updated location from the location service 251. The mode selection client application 248 may determine that the updated location is a different location. In some cases, if the updated location is merely a few feet away from a previous location, the mode selection client application 248 may determine that the updated location is not a different location. The mode selection client application 248 may then submit the current location 221 to the location classification service 215 via the network 209.

The location classification service 215, as configured by the feature identification configuration data 239, queries the map feature data 236 and the map feature classifications 224 based at least in part on the current location 221. For example, the location classification service 215 may identify a specific map feature encompassing the current location 221, and then may identify a map feature classification 224 corresponding to the specific map feature. In various embodiments, the location classification service 215 may be an external service and/or rely upon externally provided map feature data 236 and/or map feature classifications 224 provided by the external map data service 243 or a plurality of different services.

In one embodiment, the mode selection service 218 obtains the map feature classification 224 identified for the current location 221, if available. The mode selection service 218 determines one or more applicable alert mode selection rules 227 based at least in part on the map feature classification 224. By applying one or more alert mode selection rules 227, the mode selection service 218 selects one or more alert modes. The mode selection service 218 initiates a configuration of the mobile device 103 to use one or more selected alert modes 230 for one or more types of notifications. For example, the mode selection service 218 may send a directive to the mode selection client application 248 to initiate usage of the selected alert mode(s) 230. In one scenario, the selected alert modes 230 may be determined and configured in response to a particular notification being sent to the mobile device 103.

In another embodiment, the location classification service 215 returns a determined map feature classification 224 back to the mode selection client application 248. The mode selection client application 248 may then determine, in the mobile device 103, which alert mode(s) to be employed. To this end, the mode selection client application 248 may have access to the alert mode selection rules 227 in the data store 212, or alert mode selection rules 227 may be locally stored in the mobile device 103.

Upon configuration of an alert mode within the mobile device 103, a dialog or other notification may be displayed within a user interface 254 of the mobile device 103. Such configuration of the alert mode may be subject to confirmation by the user, and the user may be capable of overriding such an alert mode configuration. Upon configuration, the selected alert mode 230 may remain in use by the mobile device 103 until expiration of a duration associated with a map feature at the current location 221, until the mobile device 103 is no longer located at the same map feature, until the user manually changes the selected alert mode 230, or until some other event. In some embodiments, the mode selection client application 248 may configure the mobile device 103 to revert to a default alert mode and/or a previously selected alert mode upon change of the current location 221 so as to leave the particular map feature. When a user manually configures an alert mode, the manually selected alert mode 233 may be reported back to the computing environment 203 for use in generating the alert mode selection history 242.

It is noted that the mode selection service 218 and/or the mode selection client application 248 may be configured to refrain from initiating configuration of a selected alert mode 230 in a mobile device 103 where the mobile device 103 is associated with a velocity meeting or exceeding a maximum threshold. For example, if a user with a mobile device 103 is merely driving past a particular map feature, it may be desirable not to have the mobile device 103 change alert modes.

Various other techniques relating to location-based notifications are described in U.S. patent application Ser. No. 13/596,119 filed on Aug. 28, 2012 and entitled "MOBILE NOTIFICATIONS BASED UPON LOCATION," which is incorporated herein by reference in its entirety.

Figure 3:
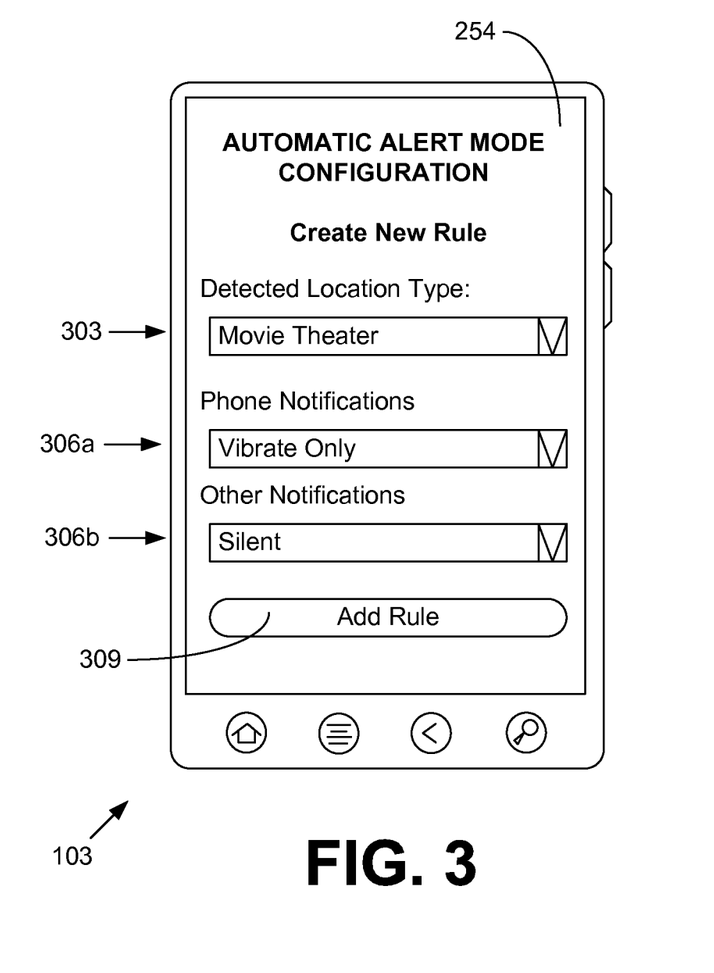
FIG. 3 is a drawing of an example of a user interface rendered by a mobile device in the networked environment of FIG. 2 according to various embodiments of the present disclosure.

Turning now to FIG. 3, shown is an example user interface 254 rendered by a mobile device 103 in the networked environment 200 (FIG. 2) according to various embodiments. The user interface 254 facilitates creation of alert mode selection rules 227 (FIG. 2) by users. The user interface 254 includes a classification specification component 303 that allows a user to select from a listing of possible map feature classifications 224 (FIG. 2). Also, the user interface 254 includes one or more alert mode selection components 306 to facilitate selection of particular alert modes for various types of notifications. For example, the alert mode selection component 306*a* facilitates selection of an alert mode for phone call notifications, while the alert mode selection component 306*b* facilitates selection of an alert mode for other notifications. The add rule component 309 creates an alert mode selection rule 227 according to the selected parameters. It is noted that additional parameters regarding identification of map feature classifications 224 and selection of alert modes may be specified in other embodiments.

Figure 4:
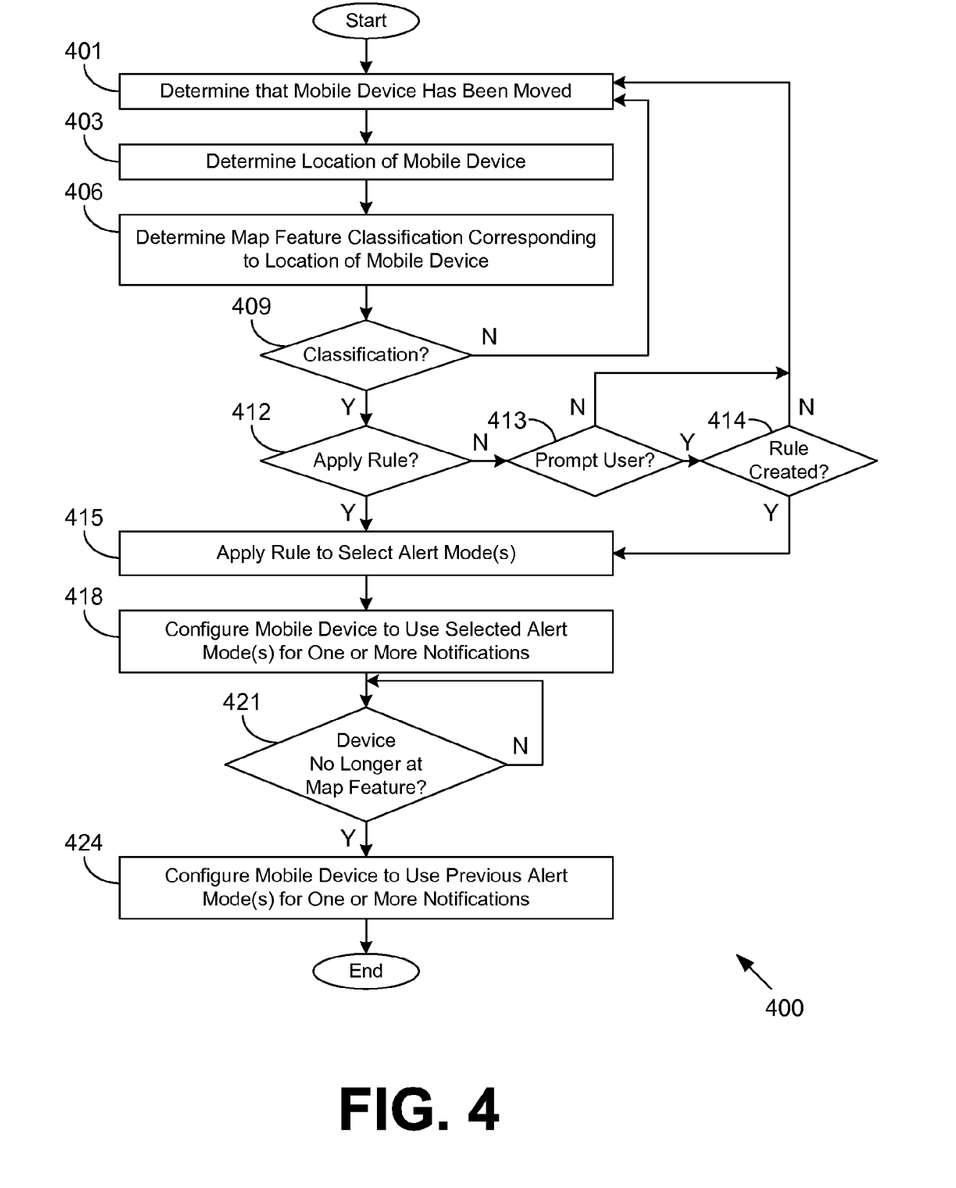
FIG. 4 is a flowchart illustrating one example of functionality implemented as portions of a mode selection service and/or a mode selection client application executed in the networked environment of FIG. 2 according to various embodiments of the present disclosure.

Referring next to FIG. 4, shown is a flowchart 400 that provides one example of the operation of a portion of the mode selection service 218 (FIG. 2) and/or the mode selection client application 248 (FIG. 2) according to various embodiments. It is understood that the flowchart of FIG. 4 provides merely an example of the many different types of functional arrangements that may be employed to implement the operation of the portion of the mode selection service 218 and/or the mode selection client application 248 as described herein. As an alternative, the flowchart of FIG. 4 may be viewed as depicting an example of steps of a method implemented in the computing environment 203 (FIG. 2) and/or the mobile device 103 (FIG. 2) according to one or more embodiments.

Beginning with box 401, whether the mobile device 103 has been moved may be determined. As a non-limiting example, when the mobile device 103 is moved, the accelerometer may detect movement. In box 403, the current location 221 (FIG. 2) of the mobile device 103 is determined. For example, the location service 251 (FIG. 2) may determine the current location 221, which may then be provided to the mode selection service 218 and/or the location classification service 215 (FIG. 2). The current location 221 may be determined in response to a determination of movement of the mobile device 103 so as to conserve power in the mobile device 103 for location determination. In box 406, a map feature classification 224 (FIG. 2) is for the current location 221 is determined by and obtained from the location classification service 215.

In box 409, the mode selection service 218 and/or the mode selection client application 248 determines whether a valid map feature classification 224 is determined. In some cases, the current location 221 may be unclassified, or a valid map feature classification 224 may not be determined. If a map feature classification 224 is not determined, the mode selection service 218 and/or the mode selection client application 248 returns to box 403 and again determines the current location 221. If a map feature classification 224 is determined, the mode selection service 218 and/or the mode selection client application 248 continues to box 412.

In box 412, the mode selection service 218 and/or the mode selection client application 248 determines whether to apply an alert mode selection rule 227 (FIG. 2). As an example, it may be decided not to apply an alert mode selection rule 227 based upon the velocity of the mobile device 103. As another example, a user may manually override the application of alert mode selection rules 227. If an alert mode selection rule 227 is not to be applied or if an alert mode selection rule 227 does not exist for the map feature classification 224, the mode selection service 218 and/or the mode selection client application 248 moves to box 413 and determines whether to prompt the user to create an alert mode selection rule 227 for the map feature classification 224. It is noted that social norms may change over time, and users may be given the opportunity to change existing alert mode selection rules 227 as well.

If the user is not prompted to create a rule, the mode selection service 218 and/or the mode selection client application 248 returns to box 401. If the user is prompted to create a rule, a user interface 254 (FIG. 2) may be rendered for rule creation for the map feature classification 224. In box 414, the mode selection service 218 and/or the mode selection client application 248 determines whether an alert mode selection rule 227 has been created. If an alert mode selection rule 227 has not been created, the mode selection service 218 and/or the mode selection client application 248 returns to box 401.

If an alert mode selection rule 227 has been created, the mode selection service 218 and/or the mode selection client application 248 continues to box 415. If an alert mode selection rule 227 is to be applied, the mode selection service 218 and/or the mode selection client application 248 continues from box 412 to box 415. In box 415, the mode selection service 218 and/or the mode selection client application 248 applies one or more alert mode selection rules 227 to select one or more alert modes.

In box 418, the mode selection service 218 and/or the mode selection client application 248 configures the mobile device 103 to use the selected alert mode(s) 230 for one or more types of notifications. In box 421, the mode selection service 218 and/or the mode selection client application 248 determines whether the mobile device 103 is no longer at the map feature corresponding to the map feature classification 224. If the mobile device 103 is still at the map feature, the determination of box 421 may be repeated.

When the mobile device 103 is no longer at the map feature, the mode selection service 218 and/or the mode selection client application 248 continues to box 424 and configures the mobile device 103 to use previously selected alert modes. Alternatively, the mobile device 103 may move from one map feature to another map feature, which may fall under another map feature classification 224 and rule set. Thereafter, the flowchart 400 ends.

Figure 5:
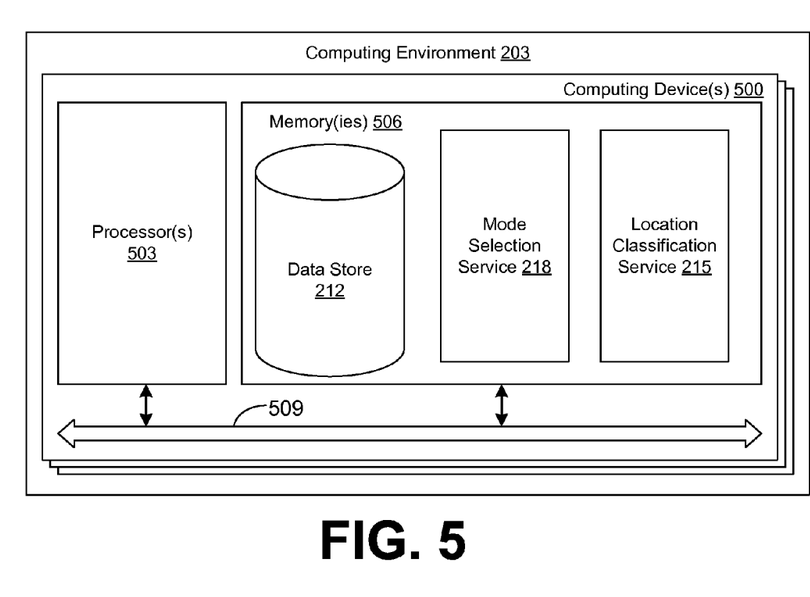
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506, 606 and executable by the processor 503 are a mode selection service 218, a location classification service 215, and potentially other applications. Also stored in the memory 506 may be a data store 212 and other data. In addition, an operating system may be stored in the memory 506 and executable by the processor 503.

Figure 6:
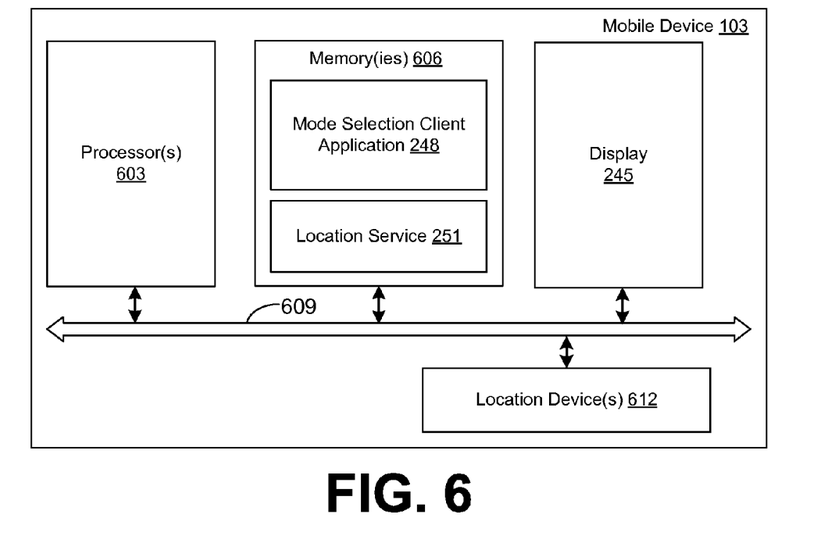
FIG. 6 is a schematic block diagram that provides one example illustration of a mobile device employed in the networked environment of FIG. 2 according to various embodiments of the present disclosure.

With reference to FIG. 6, shown is a schematic block diagram of the mobile device 103 according to an embodiment of the present disclosure. The mobile device 103 includes at least one processor circuit, for example, having a processor 603 and a memory 606, both of which are coupled to a local interface 609. The local interface 609 may comprise, for example, a data bus with an accompanying address/control bus or other bus structure as can be appreciated. A display 245 and a location device 612 (e.g., a GPS device, an RFID sensor, etc.) may also be coupled to the local interface 609.

Stored in the memory 606 are both data and several components that are executable by the processor 603. In particular, stored in the memory 606 and executable by the processor 603 are a mode selection client application 248, a location service 251, and potentially other applications. In addition, an operating system may be stored in the memory 606 and executable by the processor 603.

It is understood that there may be other applications that are stored in the memory 506, 606 and are executable by the processor 503, 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506, 606 and are executable by the processor 503, 603. In this respect, the term "executable" means a program file that is in a form that can ultimately be run by the processor 503, 603. Examples of executable programs may be, for example, a compiled program that can be translated into machine code in a format that can be loaded into a random access portion of the memory 506, 606 and run by the processor 503, 603, source code that may be expressed in proper format such as object code that is capable of being loaded into a random access portion of the memory 506, 606 and executed by the processor 503, 603, or source code that may be interpreted by another executable program to generate instructions in a random access portion of the memory 506, 606 to be executed by the processor 503, 603, etc. An executable program may be stored in any portion or component of the memory 506, 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506, 606 is defined herein as including both volatile and nonvolatile memory and data storage components. Volatile components are those that do not retain data values upon loss of power. Nonvolatile components are those that retain data upon a loss of power. Thus, the memory 506, 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503, 603 may represent multiple processors 503, 603 and/or multiple processor cores and the memory 506, 606 may represent multiple memories 506, 606 that operate in parallel processing circuits, respectively. In such a case, the local interface 509, 609 may be an appropriate network that facilitates communication between any two of the multiple processors 503, 603, between any processor 503, 603 and any of the memories 506, 606, or between any two of the memories 506, 606, etc. The local interface 509, 609 may comprise additional systems designed to coordinate this communication, including, for example, performing load balancing. The processor 503, 603 may be of electrical or of some other available construction.

Although the mode selection service 218, the location classification service 215, the mode selection client application 248, the location service 251, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the mode selection service 218 and/or the mode selection client application 248. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503, 603 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the mode selection service 218, the location classification service 215, the mode selection client application 248, and the location service 251, that comprises software or code can be embodied in any non-transitory computer-readable medium for use by or in connection with an instruction execution system such as, for example, a processor 503, 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in at least one computing device, wherein, when executed, the program causes the at least one computing device to at least:
   obtain a current location of a mobile device;
   identify a map feature corresponding to the current location;
   determine a generic feature classification for the map feature;
   select an alert mode of a plurality of alert modes based at least in part on the generic feature classification and at least one rule, each of the plurality of alert modes specifying a respective notification sound volume for the mobile device;
   receive a user specification of the at least one rule, the user specification mapping the generic feature classification to at least one of the plurality of alert modes, the at least one of the plurality of alert modes including the selected alert mode;
   automatically configure the mobile device to use the selected alert mode for at least one type of notification; and
   automatically configure the mobile device to use a previously configured alert mode of the plurality of alert modes in response to determining that the current location of the mobile device no longer corresponds to the map feature.

2. The non-transitory computer-readable medium of claim 1, wherein the user specification of the at least one rule excludes a specification of the map feature.

3. A system comprising:
   a data store configured to at least store mapping data; and
   at least one computing device in communication with the data store, the at least one computing device configured to at least:
   obtain a current location of a mobile device;

determine a classification of the current location based at least in part on the mapping data stored in the data store that identifies a feature at the current location; and select an alert mode of a plurality of alert modes for the mobile device based at least in part on a source of a notification for which an alert is to be generated and the classification of the current location.

4. The system of claim 3, wherein the at least one computing device is further configured to at least obtain the current location in response to determining, via an accelerometer of the mobile device, that the mobile device has been moved.

5. The system of claim 3, wherein the current location of the mobile device includes an altitude of the mobile device, and the mapping data identifies the feature as being at the current location based at least in part on the altitude.

6. A system comprising:
a data store configured to at least store mapping data; and
at least one computing device in communication with the data store, the at least one computing device configured to at least:
obtain a current location of a mobile device;
determine a classification of the current location based at least in part on mapping data stored in the data store that identifies a feature at the current location;
select an alert mode of a plurality of alert modes for the mobile device based at least in part on the classification of the current location; and
wherein the feature is associated with a time period of existence, and the classification is determined based at least in part on determining that a current time is within the time period of existence associated with the feature.

7. A system comprising,
a data store configured to at least store mapping data; and
at least one computing device in communication with the data store, the at least one computing device configured to at least:
obtain a current location of a mobile device;
determine a classification of the current location based at least in part on mapping data stored in the data store that identifies a feature at the current location;
select an alert mode of a plurality of alert modes for the mobile device based at least in part on the classification of the current location; and
wherein the mapping data associates the feature with a particular geographic area, and the feature is determined to be at the current location based at least in part on determining that the particular geographic area encompasses the current location.

8. A system comprising,
a data store configured to at least store mapping data; and
at least one computing device in communication with the data store, the at least one computing device configured to at least:
obtain a current location of a mobile device;
determine a classification of the current location based at least in part on mapping data stored in the data store that identifies a feature at the current location;
select an alert mode of a plurality of alert modes for the mobile device based at least in part on the classification of the current location; and
obtain the mapping data from at least one of an external data provider or a plurality of different services.

9. A system comprising,
a data store configured to at least store mapping data; and
at least one computing device in communication with the data store, the at least one computing device configured to at least:
obtain a current location of a mobile device;
determine a classification of the current location based at least in part on mapping data stored in the data store that identifies a feature at the current location;
select an alert mode of a plurality of alert modes for the mobile device based at least in part on the classification of the current location; and
determine whether to initiate a configuration of the mobile device to use the selected alert mode based at least in part on a current velocity of the mobile device.

10. The system of claim 3, wherein at least one alert mode of the plurality of alert modes activates a vibration device of the mobile device upon an alert.

11. The system of claim 3, wherein the mobile device comprises a mobile phone, and each alert mode of the plurality of alert modes configures a respective volume for at least one of an incoming call sound alert or an incoming text message sound alert.

12. The system of claim 3, wherein each alert mode of the plurality of alert modes configures a respective volume for an incoming email sound alert.

13. The system of claim 3, wherein the at least one computing device is further configured to at least select the selected alert mode further based at least in part on a user-configurable rule that associates the classification with the selected alert mode.

14. A system comprising,
a data store configured to at least store mapping data; and
at least one computing device in communication with the data store, the at least one computing device configured to at least:
obtain a current location of a mobile device;
determine a classification of the current location based at least in part on mapping data stored in the data store that identifies a feature at the current location;
obtain alert mode history data indicating which of a plurality of alert modes were previously used by a plurality of users within at least one of: a particular geographic area associated with the feature or a plurality of different geographic areas with a plurality of features that correspond to the classification of the current location; and
select an alert mode of the plurality of alert modes for the mobile device based at least in part on the classification of the current location and the alert mode history data.

15. A computer-implemented method comprising:
determining, by a mobile device, a location of the mobile device;
obtaining, by the mobile device, a map feature classification of the location from a another computing device;
automatically configuring at least one notification of the mobile device to use a particular alert mode of a plurality of alert modes, the particular alert mode being selected based at least in part on the map feature classification of the location;
obtaining, by the mobile device, a duration associated with the map feature classification; and
automatically configuring the at least one notification of the mobile device to revert to a previously configured alert mode of the plurality of alert modes when a current time exceeds the duration.

16. The computer-implemented method of claim 15, further comprising reporting the location of the mobile device to the other computing device.

17. The computer-implemented method of claim 15, further comprising selecting, by the mobile device, the particular alert mode based at least in part on a predefined rule that associates the map feature classification with the particular alert mode, the map feature classification being generic to the location of the mobile device.

18. The computer-implemented method of claim 15, wherein the at least one notification comprises at least one of: an incoming call notification, an incoming text message notification, an incoming email notification, or an incoming social network notification.

19. The computer-implemented method of claim 15, wherein the location of the mobile device is determined responsive to the mobile device receiving an event associated with the at least one notification.

20. The computer-implemented method of claim 15, further comprising:
   determining, by the mobile device, a velocity of the mobile device; and
   refraining from automatically configuring the at least one notification of the mobile device to use the particular alert mode based at least in part on the velocity of the mobile device.

21. The computer-implemented method of claim 15, wherein determining the location of the mobile device further comprises determining, by the mobile device, an altitude of the mobile device, and the method further comprises reporting, by the mobile device, the altitude to the other computing device.

22. The computer-implemented method of claim 15, further comprising:
   determining, by the mobile device, a subsequent location of the mobile device; and
   automatically configuring the at least one notification of the mobile device to revert to the previously configured alert mode based at least in part on the subsequent location.

23. The system of claim 6, wherein the at least one computing device is further configured to at least obtain the current location in response to determining, via an accelerometer of the mobile device, that the mobile device has been moved.

24. The system of claim 7, wherein the at least one computing device is further configured to at least obtain the current location in response to determining, via an accelerometer of the mobile device, that the mobile device has been moved.

25. The system of claim 8, wherein the at least one computing device is further configured to at least obtain the current location in response to determining, via an accelerometer of the mobile device, that the mobile device has been moved.

26. The system of claim 9, wherein the at least one computing device is further configured to at least obtain the current location in response to determining, via an accelerometer of the mobile device, that the mobile device has been moved.

* * * * *